Nov. 3, 1959 C. P. FROMMELT 2,911,038
DEFORMABLE SELF-SUPPORTING WELDING SHIELD
Filed April 16, 1957
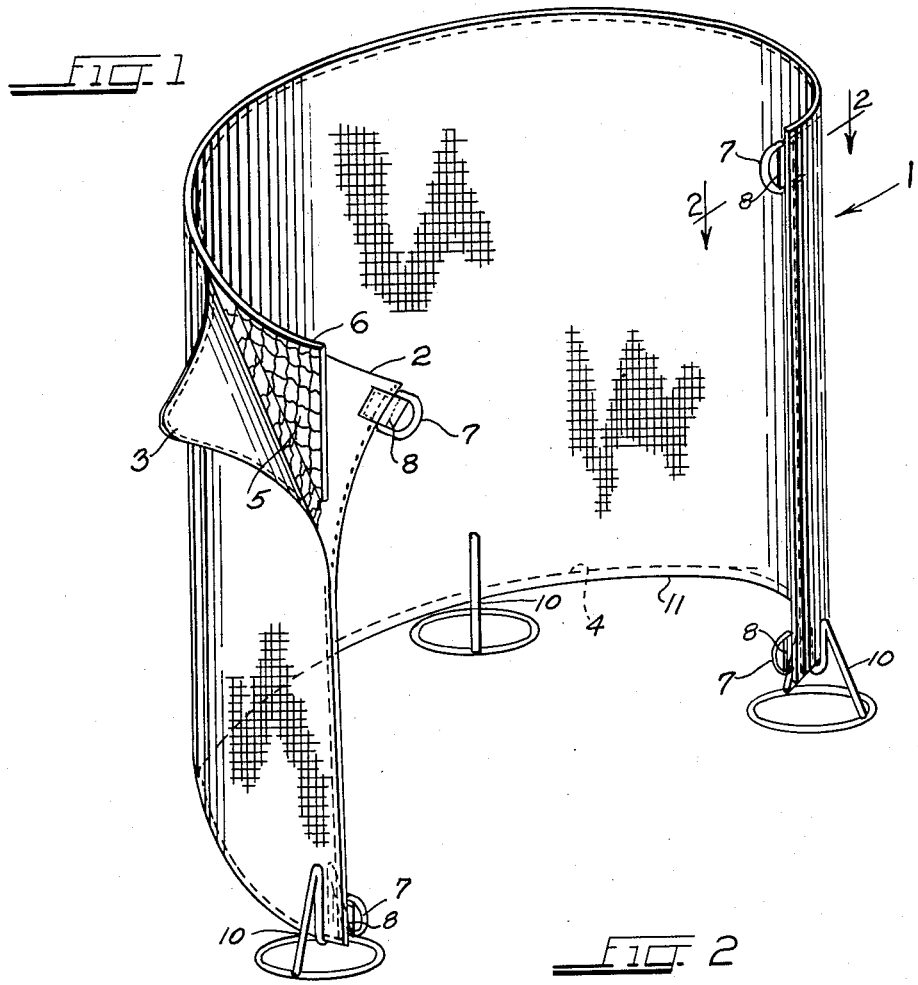
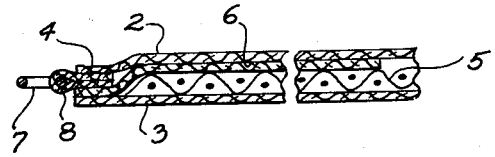
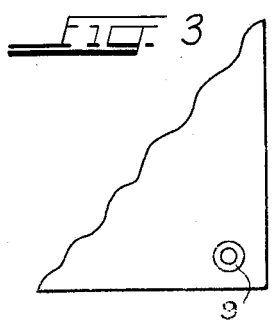
INVENTOR.
CYRIL P. FROMMELT
BY
ATTYS.

United States Patent Office 2,911,038
Patented Nov. 3, 1959

2,911,038

DEFORMABLE SELF-SUPPORTING WELDING SHIELD

Cyril P. Frommelt, Dubuque, Iowa, assignor to Dubuque Awning & Tent Company, Inc., Dubuque, Iowa, a corporation of Iowa Application April 16, 1957, Serial No. 653,196

3 Claims. (Cl. 160—351)

This invention relates to a deformable self-supporting fire-resistant durable portable welding shield which is especially adapted for use in diverse industries for the protection of personnel and property. The invention provides a welding shield which may be included as part of a welder's equipment, and is readily transported from place to place and simply and rapidly erected in various locations for effective protection.

The invention provides a new and improved lightweight welding shield of, especially, increased resistance to radiant heat and fire. The shield is also waterproof and resistant to oil, grease and various chemicals, and it is washable to return it to its original cleanliness.

The new shield is characterized by low and elevated temperature flexibility. It is also very durable, under the most adverse plant conditions.

The invention further provides a welding shield which is resistant to sparks, splashes and hot particles. The shield may be installed above, below or around the job.

The invention is further characterized in that the shield embodies all the necessary elements for its use, and it may also be supported or fastened by other means for particular situations. The shield is deformable along any lines, both transversely and longitudinally, to encompass or shield the welding operation and separate it from adjacent personnel, materials or equipment. At the same time, the shield is completely self-supporting, on an edge thereof, or it may be supported on stands in raised position or suspended from above or from the side.

The new welding shield is simple and inexpensive, yet very effective for the intended purposes.

The foregoing comprise important objects of the invention, and these and other objects, advantages and functions thereof will be apparent from the specification taken with the attached drawings, in which like parts are identified by like reference characters in each of the views and in which:

Figure 1 is a perspective view from the side of a preferred embodiment of the welding shield of the invention, with one corner opened to illustrate the internal structure;

Figure 2 is a sectional view of the shield taken on line 2—2 of Figure 1; and

Figure 3 is a fragmentary elevation of one corner of the shield, illustrating an alternate construction for fastening or securing the shield.

In accordance with the invention, a deformable self-supporting durable portable welding shield is provided which includes a water-resistant radiant heat-reflective envelope of a pair of flexible fabric layers coated with a reflective metal powder, and a flexible metallic mesh screen within the envelope. The shield is both transversely and longitudinally deformable into a contoured shape, and the screen supports the shield upright on an edge of the shield while being deformed.

Fire-resistant properties are preferably imparted to the fabric by coating with a fire-resistant organic composition retaining the deformable characteristics of the fabric. At the same time, the organic composition serves as the bonding agent for the reflective metal powder, which is preferably dispersed therein. The reflective metal powder is preferably fine aluminum powder, which provides a shield resistant to radiant heat of approximately 700° F. In this manner also, the shield is waterproof and resistant to oil and various chemicals, while being tough, flexible and washable.

An important advantage of the new welding shield is that with the provision of reflective metal powder bonded to the surfaces thereof, the shield remains completely deformable and retains its reflective properties, even under strenuous conditions of use.

The welding shield can be placed very close to the source of flashing sparks or flame, substantially encompassing it. In this manner, small shields can be used to contain the sparks which fly off rapidly from the source and may endanger the personnel and the property in a wide area. The construction also makes it possible for several welders to work on the same piece without endangering one another, each area being protected by an individual shield.

The new welding shield is completely fireproof and confines even the smallest sparks, so that it is especially advantageous for safeguarding property. The shield thus constitutes a means of preventing the destruction of property by fires caused by welding operations, as has often occurred in the past. The danger of working in areas where flammable articles and liquids may be present has been greatly reduced.

The welding shield can be rolled and carried under the arm, so that there will be no tendency to avoid taking the shield from place to place for welding operations. At the job, the shield is emplaced to best advantage with no difficulty. When the shield is subjected to various types of abuse, it remains completely useful. It has a high abrasion resistance, may be knocked down, bent, struck, run over by vehicles, and so forth, and yet continue to be serviceable.

With reference to the drawings, the welding shield is generally indicated by the numeral 1. It is composed of a fabric envelope constructed of a pair of opposed layers, pieces or sheets or fabric 2 and 3, secured together adjacent each of the peripheral edges by stitching or other suitable joining means 4.

Positioned within the fabric layers 2 and 3, as an intermediate layer, is a flexible metallic mesh screen 5, extending over the area of the fabric layers. At each of the four corners of the shield, a triangular reinforcing member 6 is secured between the fabric layers 2 and 3, and it may be secured in place by the same stitching or other means 4 which joins the fabric layers.

Also secured at each of the corners of the welding shield 1 is a fastening ring 7, mounted by means of a flexible strip 8 which is stitched or otherwise connected to the fabric layers. In an alternative construction, illustrated in Figure 3, a metal grommet 9 may be secured at each of the corners of the shield. These fastening means serve for suspending or hanging the welding shield or holding it in place, employing hooks, ropes, wires and the like which are connected to or engage the rings 7.

Figure 1 also illustrates ring stands 10 which may be employed in conjunction with the welding shield 1, to support it off of the ground or other surface. This combination also provides for support on a rough or uneven base, and for ventilation at the base of the shield.

The fabric sheets 2 and 3 may be any suitable fire-resistant cloth which is naturally fire-resistant, such as asbestos, glass fibers, or fire-resistant organic resin filaments, or has been treated to render it fire-resistant. It is preferred in the invention to employ readily available and relatively economical cotton canvas, such as 12 to 15 oz. cotton duck, which has been treated with a fire-resistant flexible organic composition. Other fabrics may, however, be employed. In this manner, the organic composition serves as a carrier and binder for the finely divided reflective metal powder. Reference to "fire-resistant" means that the fabric will not continue to burn for more than several seconds after a flame is withdrawn therefrom. However, the material may be charred by the flame.

The stiffening or reinforcing members 6 may also constitute preferably fire-resistant fabric of the same type. The purpose of these members is to prevent the corners of the welding shield 1 from curling, so that the shield remains completely in the proper position. It will be apparent that other materials may be employed which will function in the same manner. Likewise, the strips 8 for securing the fastening rings 7 may be the same fabric as employed in the outer fabric layers 2 and 3. The rings 7 or the grommets 9 are metal members of conventional construction.

The metallic mesh screen 5 is stiff yet flexible. It is preferably constructed of galvanized iron wire which has sufficient flexibility so that the welding shield can be deformed in any manner, and is sufficiently stiff that the screen will support the complete welding shield 1 on an edge thereof such as 11, which extends in the long dimension of the shield, without falling, bending or sagging, when the shield is formed in the desired contour. For this purpose, 14-gauge wire has proven to be preferable for various sizes of welding shields, from 18 inches by 36 inches to 72 inches by 108 inches. The metallic screen is preferably welded at each intersection of the wires, and the openings are preferably 1 inch by 2 inches rectangular up to 60 inches in height for the screen, and 1 inch by 1 inch square above 60 inches in height (e.g., for a screen 72 inches in height by 108 inches in length). While other types and sizes of wire might be employed where the conditions are met, it has been found, for example, that 16-gauge iron wire does not have the preferred stiffness, whereas 12-gauge iron wire is stiffer than desirable.

In the preferred practice of the invention, the fabric layers 2 and 3 are coated on at least the outer surface of each with a fire-resistant halogenated organic material which is semi-solid or solid at atmospheric temperatures. For example, suitable materials are disclosed in U.S. Patent 2,299,612, wherein the material is about 20% to 70% halogenated. Preferably, the organic material constitutes a halogenated vinyl resin, and it is further preferred to employ a polymer of vinyl chloride. The polymer may be a homopolymer, i.e., polyvinylchloride, or a heteropolymer of vinyl chloride, the latter preferably containing a major proportion of vinyl chloride. Suitable copolymers are known, for example, copolymers of vinyl chloride and vinylidene chloride. These synthetic organic resin coating compositions may also contain suitable known stabilizers and plasticizers.

The organic coating material is intimately mixed with the reflective metal powder, in a sufficient quantity of the latter that the resulting surface of the fabric is substantially completely covered with the metal powder. For example, the organic material and the metal powder may be used in about equal weight proportions, or the organic material may be employed in a greater proportion, i.e., up to three parts or greater per part of the metal powder. The preferred metal powder for commercial application is fine aluminum powder. However, other reflective metals may be used, for example, copper, silver or gold.

For enhanced protection of the shield against destructive forces, the coating composition may also contain a mildew inhibitor. Thus, about 0.75 to 1% of copper-8-quinolinolate, based on the weight of the coated canvas, may be provided in the coating composition.

The application of the organic composition containing the metal powder may be made as described in the above-referred to patent. It is preferred to impregnate e.g. cotton duck and coat it on both sides with a very thin layer of the composition, by multiple passes through a convection oven, which fuses the composition to the cloth. Between passes, the fabric may be calendered at high pressure to secure a thorough and complete bond.

The resulting composite fabric is especially suitable for use in the welding shield construction, as it is very pliable and flexible and may be bent sharply along any line without substantial effect on the properties of the material. The powdered metal coating provides all the advantages of a heat reflective surface while retaining the advantages of the use of organic material-impregnated fabric. In this respect, the composite fabric is substantially superior to the use of a sheet of metal foil such as aluminum foil laminated to a fabric sheet.

The composite fabric generally meets specifications for waterproofed, fire and weather-resistant treated canvas. The weight of finished fabric may be about 25% to 70% greater than the initial weight of the canvas. The finished fabric has elevated and low temperature flexibility, resists ageing, withstands severe abrasion, is resistant to oil and grease, and may be washed to restore its cleanliness.

The construction is assembled as illustrated in the drawings, and the outer fabric sheets 2 and 3 and the reinforcing members 6 are secured along their edges by stitching, stapling or adhesively bonding. The fabrication of the shield is thus simple, rapid and economical.

The welding shield 1 is readily rolled for moving to different locations, and it may be rolled or hung for storage. At the job, it is opened and located around the work, standing it on its long edge 11, mounting it on metal ring stands 10 or the like, or fastening or suspending it by means of the fastening rings 7 or grommets 9. The shield is bent or molded to conform to the work, the work area, or the personnel or property situation. When the job is complete, the shield is simply rolled and removed. In this manner, it is significantly advantageous over various improvised shields, sheet metal, or other means or devices for covering the welding area. The shield embodies a combination of properties and functions not hitherto provided.

The invention is hereby claimed as follows:

1. A self-supporting durable flexible portable welding shield which comprises: a fire-resistant radiant heat-reflective fabric envelope consisting essentially of two layers of flexible fabric joined at the peripheral edges thereof, and a fire-resistant radiant heat-reflective coat on at least the outer surface of each said layer, of a fire-resistant flexible organic composition containing reflective metal powder dispersed therein; and a flexible metallic mesh screen positioned within said envelope, said shield being deformable both transversely and longitudinally into a contoured shape, said screen constituting the sole support for said shield and having sufficient rigidity to support said shield upright on an edge thereof while being transversely and longitudinally deformable into a desired contour.

2. A self-supporting durable flexible portable welding shield which comprises: a fire-resistant radiant heat-reflective fabric envelope consisting essentially of two layers of flexible fabric joined at the peripheral edges thereof, and a fire-resistant radiant heat-reflective coat on at least the outer surface of each said layer, of a fire-resistant flexible vinyl polymer composition containing reflective aluminum powder dispersed therein; and a flexible metallic mesh screen positioned within said envelope, said shield being deformable both transversely and longitudinally into a contoured shape, said screen constituting the sole support for said shield and having sufficient rigidity to support said shield upright on an edge thereof while being transversely and longitudinally deformable into a desired contour.

3. A self-supporting durable flexible portable welding shield which comprises: a fire-resistant radiant heat-reflective fabric envelope consisting essentially of two layers of flexible cotton duck fabric joined at the peripheral edges therof, and a fire-resistant radiant heat-reflective coat on at least the outer surface of each said layer, of a fire-resistant flexible vinyl chloride polymer composition containing reflective aluminum powder dispersed therein; and a flexible metallic mesh screen positioned within said envelope, said shield being deformable both transversely and longitudinally into a contoured shape, said screen constituting the sole support for said shield and having sufficient rigidity to support said shield upright on an edge thereof while being transversely and longitudinally deformable into a desired contour.

References Cited in the file of this patent

UNITED STATES PATENTS

| | | |
|---|---|---|
| 292,037 | Nagel | Jan. 15, 1884 |
| 487,470 | Cockrill | Dec. 6, 1892 |
| 694,761 | Lathrop | Mar. 4, 1902 |
| 1,871,571 | Weber | Aug. 6, 1932 |
| 2,062,469 | Morgan | Dec. 1, 1936 |
| 2,577,667 | Waite | Dec. 4, 1951 |